United States Patent
Thomson

(10) Patent No.: US 12,340,806 B2
(45) Date of Patent: Jun. 24, 2025

(54) TRANSCRIPTION GENERATION

(71) Applicant: Sorenson IP Holdings, LLC, Salt Lake City, UT (US)

(72) Inventor: David Thomson, Bountiful, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 363 days.

(21) Appl. No.: 17/664,751

(22) Filed: May 24, 2022

(65) Prior Publication Data

US 2023/0386471 A1 Nov. 30, 2023

(51) Int. Cl.
| | | |
|---|---|---|
| *G10L 15/26* | (2006.01) | |
| *G10L 15/22* | (2006.01) | |
| *G10L 21/00* | (2013.01) | |
| *G10L 21/0272* | (2013.01) | |

(52) U.S. Cl.
CPC .............. *G10L 15/26* (2013.01); *G10L 15/22* (2013.01); *G10L 21/0272* (2013.01)

(58) Field of Classification Search
None
See application file for complete search history.

(56) References Cited

U.S. PATENT DOCUMENTS

| | | | | |
|---|---|---|---|---|
| 9,674,341 B1* | 6/2017 | Pakidko | ............. | H04M 3/2281 |
| 10,388,272 B1* | 8/2019 | Thomson | ................ | G10L 15/22 |
| 2002/0023142 A1* | 2/2002 | Michaelis | ............. | G06F 16/683 |
| | | | | 707/E17.107 |
| 2005/0152557 A1* | 7/2005 | Sasaki | ..................... | H04S 7/302 |
| | | | | 381/59 |
| 2014/0168354 A1* | 6/2014 | Clavel | ...................... | H04N 7/15 |
| | | | | 348/14.09 |
| 2018/0197544 A1* | 7/2018 | Brooksby | .............. | H04N 7/155 |
| 2019/0312973 A1* | 10/2019 | Engelke | ................ | G10L 15/183 |
| 2021/0058510 A1* | 2/2021 | Engelke | .................. | G10L 25/60 |
| 2021/0110812 A1* | 4/2021 | Naylor-Teece | ......... | G10L 25/69 |
| 2021/0398537 A1* | 12/2021 | Spry | ................. | H04M 1/72478 |
| 2023/0419944 A1* | 12/2023 | Haulick | ........... | G10K 11/17823 |

FOREIGN PATENT DOCUMENTS

CA           2839685 C  *  7/2020  ............. H04B 13/00

\* cited by examiner

*Primary Examiner* — Paras D Shah
*Assistant Examiner* — Mulugeta Tuji Dugda
(74) *Attorney, Agent, or Firm* — Maschoff Brennan

(57) ABSTRACT

A method of transcript presentation may include generating, by a device, audio data by capturing via a microphone of the device an audible audio signal that is broadcast by the device. The audible audio signal may include words. The method may also include obtaining, at the device, transcript data. The transcript data may be generated using the audio data and may include a transcription of the words of the audible audio data. The method may also include presenting, by the device, the transcription.

19 Claims, 11 Drawing Sheets

TRANSCRIPTION GENERATION

FIELD

The embodiments discussed herein are related to transcription generation.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method transcript presentation may include generating, by a device, audio data using an audible audio signal that is broadcast by the device. The method may also include obtaining, at the device, transcript data. The transcript data may be generated using the audio data and may include a transcription of the audio data. The method may also include presenting, by the device, the transcript data.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
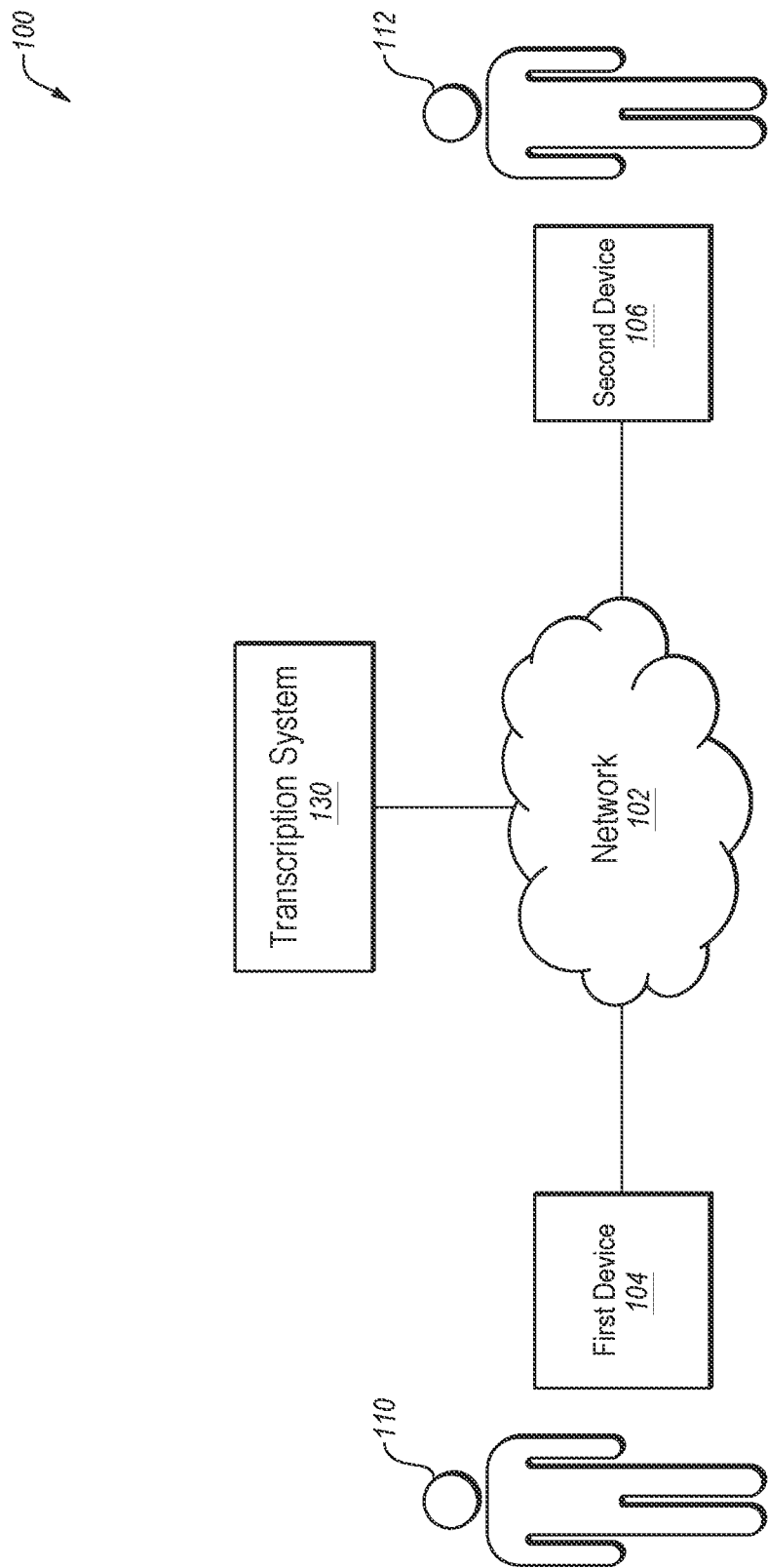
FIG. 1 illustrates an example environment for transcription generation.

In some circumstances, a person may be presented with transcriptions of real-time audio. For example, during a phone call between the person and another person, the person may receive transcriptions of audio of the phone call. In these and other circumstances, the transcriptions may be presented in real-time or substantially real-time to help to maintain a close relationship between the transcriptions and the audio.

In some circumstances, a phone call may occur by way of a device, such as a smart phone or cellular device. In these and other embodiments, the audio of the phone call may be provided to a transcription system that may be configured to generate a transcription of the audio. The transcription system may be configured to provide the transcription to the device for presentation to a user. In some circumstances, the device may provide access to the audio to allow the audio to be provided to a transcription system. In other circumstances, the device may not provide access to the audio during a phone call when the phone call is made using a native dialer of the device. As a result, other methods may be used to obtain access to the audio to provide the audio to the system to obtain the transcription of the phone call.

Some embodiments of this disclosure may relate to one or more systems and/or methods to obtain access to audio of a phone call. For example, in some embodiments, a device being used for a phone call may activate the microphone of the device such that the device captures the audio being broadcast by the device. For example, the device may broadcast the audio being spoken by the third party of the phone call using a speaker of the device. The microphone of the device may capture the audio being spoken. The device may provide the audio captured by the microphone to a transcription system. The transcription system may generate a transcription of the audio and provide the transcription back to the device for display in substantially real time.

Some embodiments of this disclosure may also relate to one more systems and/or methods that may select an audio conveyance function from multiple audio conveyance functions. Each of the audio conveyance functions may provide audio of a phone call to a transcription system in a unique manner. For example, in some embodiments, a system may obtain data regarding a condition of a device. Based on the condition of the device the system may select an audio conveyance function that may be used by the device to provide audio to the transcription system. The device may select different audio conveyance functions based on different conditions of the device. For example, a device may default to an audio conveyance function that uses the microphone to capture the audio of a phone call and provide the audio to the transcription system. However, when the device is in a noisy environment such that it may be difficult to obtain the audio of a phone call through the microphone of the device, the device may select a different audio conveyance function to direct the audio to the transcription system.

Turning to the figures, FIG. 1 illustrates an example environment 100 for transcription generation. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100. In some embodiments, the network 102 may also be coupled to or may include portions of a telecommunications network, including telephone lines, for sending data in a variety of different communication protocols, such as a plain old telephone system (POTS).

Each of the first device 104 and the second device 106 may include or be any electronic or digital computing device. For example, the first device 104 may include a desktop computer, a laptop computer, a smartphone, a mobile phone, a tablet computer, a telephone, a phone console, a video phone, a caption device, a captioning telephone, or any other computing device that may be used for communication between a first user 110 of the first device 104 and a second user 112 of the second device 106. The second device 106 may include a desktop computer, a laptop computer, a smartphone, a mobile phone, a tablet computer, a telephone, a phone console, a video phone, a caption device, a captioning telephone, or any other computing device that may be used for communication between the first user 110 of the first device 104 and the second user 112 of second device 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first device 104 and the second device 106 may be configured to establish communication sessions with other devices. For example, each of the first device 104 and the second device 106 may be configured to establish an outgoing communication session, such as a telephone call, voice over internet protocol (VoIP) call, video call, or conference call, among other types of outgoing communication sessions, with another device over a telephone line or network.

In some embodiments, each of the first device 104 and the second device 106 may be configured to obtain audio data during a communication session. The audio data may be part of an audio communication session, such as a telephone call, VoIP call, or conference call, among other audio communication sessions. As used in this disclosure, the term audio data or audio signal may be used generically to refer to data or signals that represent sounds that may include spoken words. Furthermore, the term "audio data" or "audio signal" may be used generically to include audio in any format, such as a digital format, an analog format, or a propagating wave format.

As an example of obtaining audio data, the first device 104 may be configured to obtain first audio data from the first user 110. For example, the first device 104 may obtain the first audio data from a microphone of the first device 104 or from another device that is communicatively coupled to the first device 104.

The second device 106 may also be configured to obtain second audio data from a second user 112. In some embodiments, the second device 106 may obtain the second audio data from a microphone of the second device 106 or from another device communicatively coupled to the second device 106. During the communication session, the first device 104 may provide the first audio data to the second device 106. Alternatively or additionally, the second device 106 may provide the second audio data to the first device 104. One or both of the first device 104 and the second device 106 may be configured to provide obtained audio data to the transcription system 130.

In some embodiments, the transcription system 130 may be configured to generate a transcription of audio data of a communication session between the first device 104 and the second device 106. The audio data of the communication session may be directed to the transcription system 130 based on an audio conveyance function selected by the first device 104. In some embodiments, an audio conveyance function may be implemented to obtain and direct audio data from a communication session between the first device 104 and the second device 106 to the transcription system 130.

The audio data directed to the transcription system 130 may include the audio obtained by the second device 106 and sent to the first device 104. Alternately or additionally, the audio data may include the audio obtained by the first device 104 and provided to the second device 106 during the communication session.

The transcription system 130 may also provide the generated transcription of the audio data to either one or both of the first device 104 and the second device 106. Either one or both of the first device 104 and the second device 106 may be configured to present the transcription received from the transcription system 130. For example, the first device 104 may be configured to display the received transcriptions on a display that is part of the first device 104 or that is communicatively coupled to the first device 104. With respect to FIG. 1, the disclosure may discuss obtaining and presenting transcriptions by the first device 104 for ease in explanation. However, any description of obtaining and presenting transcriptions may apply to either the first device 104, the second device 106, or both unless otherwise specified.

In some embodiments, the transcription may be provided to the first device 104, the second device 106, or both the first device 104 and the second device 106 in real-time or substantially real-time. For example, the audio may be broadcast by the first device 104 and within a limited time frame, such as 0.5, 1, 3, 5, 10, or 15 seconds, a transcription of the speech of the audio data may be presented by the first device 104. Thus, the transcription may not be provided all at once. Rather, the transcription may be presented on a rolling basis based on the speech in the audio broadcast by the first device 104, such as closed captioning provided on televisions in the United States.

In some embodiments, the transcription system 130 may include any configuration of hardware, such as processors, servers, and database servers that are networked together and configured to perform a task. For example, the transcription system 130 may include one or multiple computing systems, such as multiple servers that each include memory and at least one processor.

In these and other embodiments, the transcription system 130 may be configured to generate a transcription of audio. For example, the transcription system 130 may be configured to generate a transcription of audio using automatic speech recognition (ASR). In some embodiments, the transcription system 130 may use fully machine-based ASR systems that may operate without human intervention. Alternately or additionally, the transcription system 130 may be configured to generate a transcription of audio using a revoicing transcription system. The revoicing transcription system may receive and broadcast audio to a human agent. The human agent may listen to the broadcast and speak the words from the broadcast. The words spoken by the human agent may be captured to generate revoiced audio. The revoiced audio may be used by a speech recognition program to generate the transcription of the audio.

As noted previously, the transcription system 130 may obtain audio data based an audio conveyance function that is implemented to obtain and direct the audio data to the transcription system 130. An audio conveyance function may be any combination of methods and/or systems that may be used to obtain and direct audio of a communication session between the first device 104 and the second device 106 to the transcription system 130. For example, an audio conveyance function may be a method performed by the first device 104 that is configured to obtain audio of a communication session between the first device 104 and the second device 106 and direct the audio to the transcription system 130. As another example, an audio conveyance function may be a method performed by the first device 104 and a system and/or device associated with the first device 104 that obtains audio of a communication session between the first device 104 and the second device 106 and directs the audio to the transcription system 130.

For example, an audio conveyance function may include the first device 104 obtaining access to audio data of a communication session occurring using a native dialer application of the first device 104. In these and other embodiments, a native dialer application of the first device 104 may be an application installed and managed by a manufacturer of the first device 104 that is used to receive and place phone calls over a wireless network using a phone number assigned to the first device 104 based on subscriber identity module (SIM) card in the first device 104 as provided by a service provider used by the first device 104 to receive and place phone calls.

In these and other embodiments, the first device 104 may include an application that may obtain the audio data and direct the audio data to the transcription system 130 via a network connection separate from a network connection used for the communication session. This audio conveyance function may be referred to in this disclosure as the native dialer capture audio conveyance function.

In some circumstances, a manufacturer of the first device 104 may not allow applications to access audio handled by the native dialer application. As such, the first device 104 may not be able to implement the native dialer capture audio conveyance function. In these and other embodiments, the first device 104 may implement other audio conveyance functions so that audio of a communication session may be obtained by the transcription system 130 and transcript data generated for the audio. Some examples of other audio conveyance functions are now provided.

As an example, the audio conveyance function may include the first device 104 capturing the audio data via a microphone of the first device 104 after the first device 104 broadcasts the audio data via a speaker to the first user 110. The first device 104 may direct the captured audio data to the transcription system 130. A further description of capturing the audio data via a microphone is provided with respect to FIGS. 2 and 3. This audio conveyance function may be referred to in this disclosure as the audio capture audio conveyance function.

As another example, the audio conveyance function may include the first device 104 directing the audio data to a secondary device for broadcasting the audio data to the first user 110. The secondary device may be configured to direct the audio data back to the first device 104 for directing to the transcription system 130. Alternately or additionally, the secondary device may direct the audio data to the transcription system 130. A further description of using a secondary device to direct the audio is provided with respect to FIGS. 2 and 3. This audio conveyance function may be referred to in this disclosure as the secondary device audio conveyance function.

As another example, the audio conveyance function may include the first device 104 requesting the first user 110 to use an application besides the native dialer of the first device 104 for communication sessions. The application may direct audio data to the transcription system 130. A further description of using an application to direct the audio is provided with respect to FIG. 2. This audio conveyance function may be referred to in this disclosure as the application audio conveyance function.

As another example, an audio conveyance function may include the first device 104 directing a communication service provider to redirect requests for communication sessions to a first communication address of the first device 104 to a second communication address associated with the first device 104. For example, the first communication address may be a first phone number provided by the service provider of the first device 104. A communication session established by the first phone number may use the native dialer of the first device 104. The second communication address may be a VoIP number that may be associated with an account that is connected to an application on the first device 104. In these and other embodiments, a communication request directed to the first communication address may be redirected to the second communication address. As a result, the first device 104 may access audio data of the communication session and direct the audio data to the transcription system 130. A further description of redirecting communication requests to direct audio data is provided with respect to FIG. 7. This audio conveyance function may be referred to in this disclosure as the redirect audio conveyance function.

As another example, an audio conveyance function may include a relay that communicatively couples the first device 104 and the second device 106 during a communication session. In these and other embodiments, the relay may obtain audio data during a communication session and direct the audio data to the transcription system 130. A further description of a relay is provided with respect to FIG. 8. This audio conveyance function may be referred to in this disclosure as the relay audio conveyance function.

As another example, an audio conveyance function may include that communication sessions are established in a conference implementation. In these and other embodiments, when a communication session is established between the first device 104 and the second device 106, the transcription system 130 is conferenced into the communication session between the first device 104 and the second device 106. As a result, audio data of the communication session is provided to the transcription system 130. A further description of conferencing is provided with respect to FIG. 9. This audio conveyance function may be referred to in this disclosure as the conference audio conveyance function.

The audio conveyance function implemented may vary based on a condition of the first device 104. A condition of the first device 104 may relate to an environment surrounding the first device 104. For example, an ambient noise level surrounding the first device 104 may be a condition of the first device 104. As another example, conditions of the first device 104 may include functionality of the first device 104, such as an ability to access audio data of a native dialer, perform conference calls, and automate phone forwarding, among others; secondary devices connected to the first device 104; a signal quality of a data signal obtained by the first device 104; functionality of a service provider used by the first device 104, such as supporting call forwarding and/or conference calling; user preferences, such as using a non-native phone number, using a third-party application for a communication session, among others. In these and other embodiments, the user preferences may be stored on the first device 104 or some other device, such as a data storage or server, and associated with the user.

The audio conveyance function selected to be implemented by the first device 104 may also vary based on systems available to the first device 104 to implement different audio conveyance functions, cost structures for providing transcriptions, and/or cost structures for different audio conveyance functions, among other considerations.

In some embodiments, the first device 104 may be configured to obtain data regarding one or more conditions of the first device 104. In these and other embodiments, the first device 104 may select an audio conveyance function based on the data regarding the one or more conditions of the first device 104.

In some embodiments, the first device 104 may obtain the data regarding the one or more conditions and select the audio conveyance function to be used during an initialization period. In these and other embodiments, the first device 104 may not reevaluate the conditions and the selected audio conveyance function may be selected until changed by the first user 110.

In some embodiments, the first device 104 may obtain data regarding the one or more conditions periodically or at some other interval of time. In these and other embodiments, the first device 104 may select an audio conveyance function based on the data regarding the one or more conditions at the interval of time.

In some embodiments, the first device 104 may obtain data regarding the one or more conditions when a request for a communication session is received. In these and other embodiments, the first device 104 may select an audio conveyance function based on the data regarding the one or more conditions for the communication session. Thus, each communication session may have any one of the audio conveyance functions selected to be implemented. In these and other embodiments, the first device 104 may obtain data regarding the one or more conditions during a communication session. As a result, an audio conveyance function may change during a communication session.

For example, at a first time the first device 104 may obtain first data regarding an ambient noise level of the first device 104. Based on the first data, the first device 104 may select an audio capture audio conveyance function for a communication session. At a second time, the first device 104 may obtain second data regarding an ambient noise level of the first device 104. The second data may indicate that the ambient noise level satisfies a threshold. In response to the second data, the first device 104 may select a different audio conveyance function to be implemented to direct audio of the communication session to the transcription system 130.

As another example, the first device 104 may select a different audio conveyance function based on a secondary device being communicatively coupled to the first device 104. As another example, the first device 104 may select a different audio conveyance function based on a change to functionality provided by the service provider of the first device 104. As another example, the first device 104 may select a different audio conveyance function based on a change of a preference of user. As another example, the first device 104 may select a different audio conveyance function based on data communication signal. For example, the first device 104 may be connected to a local wireless network, such as an 802.11 network and a wide area wireless network, such as a cellular data network, which may be a 3G, 4G, LTE, or 5G network, among other types of networks. In these and other embodiments, the first device 104 may select a different audio conveyance function based on a performance of signal from either of the networks. For example, a loss in signal quality of wide area wireless network may cause the first device 104 to select a different audio conveyance function to be implemented.

In some embodiments, the audio conveyance function selected by the first device 104 may be based on a desired or selected accuracy threshold for the transcript data generated by the transcription system 130. In these and other embodiments, an ability of the transcription system 130 to generate the transcript data may vary based on the audio conveyance function implemented by the first device 104. For example, some audio conveyance functions may generate audio data with a better audio quality than other audio conveyance functions. The accuracy of the transcript data generated by the transcription system 130 may vary based on the audio quality. Thus, based on a user preference for transcription accuracy, the first device 104 may select an audio conveyance function. In these and other embodiments, the first device 104 may change the audio conveyance function based on a change in transcription accuracy. For example, if the first device 104 obtains an indication that the accuracy of a transcription included in the transcript data is below a threshold, the first device 104 may change or request the first user 110 to change the audio conveyance function implemented by the first device 104.

In some embodiments, the transcription system 130 may use an ASR system to generate the transcription data based on the obtained audio data. In these and other embodiments, the first device 104 may provide an indication of the audio conveyance function selected by the first device 104 to the transcription system 130. The transcription system 130 may adjust the ASR system based on the audio conveyance function implemented by the first device 104. For example, the transcription system 130 may adjust one or more settings or models implemented by the ASR system based on the audio conveyance function. As an example, some audio conveyance functions may have more background noise than other audio conveyance functions. As a result, for the audio conveyance functions with higher background noise, ASR models that may generate higher accuracy transcriptions may be used for those audio conveyance functions.

Alternately or additionally, the transcription system 130 may have ASR models in the ASR system that are trained for each of the audio conveyance functions. In these and other embodiments, the ASR system may use an ASR model specific to the audio conveyance function being implemented by the first device 104. For example, for the audio conveyance functions with higher background noise, the ASR system may use an ASR model trained with higher background noise.

Alternately or additionally, the transcription system 130 may adjust one or more settings or models implemented by the ASR system based on other factors associated with the first device 104 such as the brand and model of first device 104, the operating system version running on the first device 104, or a combination of the above.

Modifications, additions, or omissions may be made to the environment 100 without departing from the scope of the present disclosure. For example, in some embodiments, the environment 100 may include additional devices. In these and other embodiments, the additional devices may be configured to present transcriptions, present revisions, obtain user input, present audio, and/or capture audio, among other functions described with respect to the first device 104 and/or the second device 106. For example, the environment 100 may include multiple other devices in communication therebetween such that the communication session is a conference call. In these and other embodiments, a transcription of audio from all or some of the devices may be generated.

In some embodiments, the environment 100 may not include the transcription system 130 that is remote from the first device 104 and/or the second device 106. In these and other embodiments, the first device 104 may include the transcription system 130. For example, the first device 104 may include an ASR system and may provide transcriptions of the audio for presentation by the first device 104.

In some embodiments, the functionality performed by the first device 104 may be performed by multiple devices. For example, the functionality of the first device 104 may be performed by three devices, a communication device, an audio presentation device, and a display device. In these and other embodiments, the communication device may handle communication protocols with the second device 106, the audio presentation device may present audio of the communication session, and the display device may correspond with the transcription system 130 and present transcriptions of the communication session. Other configurations of devices may also be used to perform the functionality of the first device 104.

Figure 2:
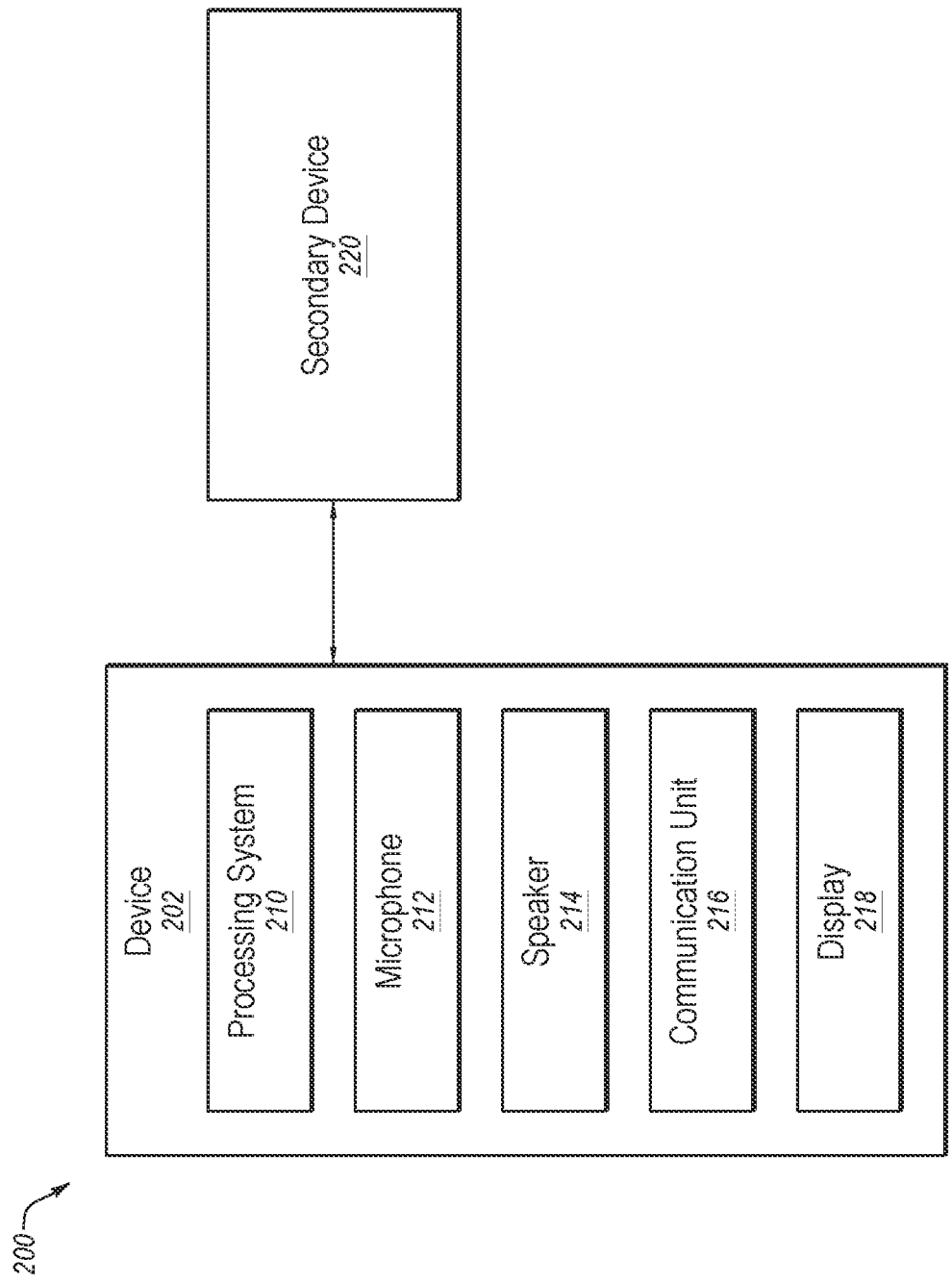
FIG. 2 illustrates another example environment for transcription generation.

FIG. 2 illustrates an example environment 200 for transcription generation. The environment 200 may be arranged in accordance with at least one embodiment described in the present disclosure. The environment 200 may include a device 202 and a secondary device 220. The device 202 may include a processing system 210, a microphone 212, a speaker 214, a communication unit 216, and a display 218. The device 202 may be analogous to the first device 104 of FIG. 1.

The processing system 210 may include at least one processor and memory and may be configured to execute instructions to cause the device 202 to perform operations as described. For example, an application may be executed by the processing system 210 to cause the device 202 to perform the operations described in this disclosure.

In some embodiments, the microphone 212 may be configured to capture audible audio signals and generate audio data that represents the audible audio signals. The speaker 214 may be configured to obtain audio data and generate audible audio signals. The communication unit 216 may include any component, device, system, or combination thereof that is configured to transmit or receive information over a network. The display 218 may be configured as one or more displays, like an LCD, LED, Braille terminal, or other type of display and configured to present transcriptions of audio.

In some embodiments, the communication unit 216 may be configured to obtain first audio data from the microphone 212 and direct the first audio data to a remote device, e.g., the second device 106 of FIG. 1, during a communication session with the remote device. The communication unit 216 may be further configured to obtain second audio data from the remote device. The communication unit 216 may provide the second audio data to the processing system 210. The processing system 210 may provide the second audio data to the speaker 214. The speaker 214 may be configured to audibly broadcast the second audio data as an audible audio signal.

In some embodiments, the processing system 210 may configure the microphone 212 to capture the audible audio signal broadcast by the speaker 214. In these and other embodiments, the microphone 212 may generate third audio data that represents the second audio data obtained by the communication unit 216 from the remote device. In short, the third audio data may include the speech from the second audio data that may be used to generate a transcription of the speech in the second audio data that may be presented to a user of the device 202 along with the broadcasting of the second audio data by the device 202.

In some embodiments, an application, other than a native application, running on the processing system 210 may have access to the third audio data. In these and other embodiments, the application may not have access to the second audio data obtained by the communication unit 216 from the remote device. The application may direct the communication unit 216 to direct the third audio data to a transcription system. In response to receiving the third audio data, the transcription system may be configured to obtain transcript data that includes a transcription of the third audio data and direct the transcript data to the communication unit 216. The processing system 210 may cause the display 218 to present the transcription of the third audio data.

In some embodiments, the third audio data may further include speech or noise other than the second audio data broadcast by the speaker 214. In these and other embodiments, the device 202 may be configured to filter out the second audio data broadcast by the speaker 214 from the third audio data captured by the microphone 212. For example, the device 202 may include an echo cancellation system configured to remove audio broadcast by the speaker 214. In these and other embodiments, the application running on the processing system 210 may obtain the third audio data before the filter such that the third audio data is not filtered to remove the second audio data. Note that the third audio data may be subsequently filtered and the filtered third audio data may be directed to the remote device by the communication unit 216 during the communication session. Alternately or additionally, when directing the third audio data to the transcription system, the processing system 210 may not implement the filter to avoid removing the second audio data from the third audio data.

In some embodiments, the processing system 210 may adjust a mode of operation of the device 202. For example, the device 202 may operate in handset mode or speaker mode during a phone call. In these and other embodiments, in response to a communication request, the device 202 may automatically cause the device 202 to be in speaker mode to better allow the microphone 212 to capture the audio broadcast by the speaker 214. Alternately or additionally, the processing system 210 may detect whether the device 202 is in handset mode or speaker mode and request the user to place the device 202 in speaker mode if the device is in handset mode.

In some embodiments, the microphone 212 may capture the audible audio signal broadcast by the speaker 214 and other audio, such as speech of a user of the device 202. The microphone 212 may generate the third audio data as a single audio channel. As a result, the audible audio signal and other audio may be not distinguishable based on audio channel.

In some embodiments, the device 202 may provide the single audio channel that includes the audible audio signal and the other audio to the transcription system. In these and other embodiments, the transcript data generated by the transcription system may include a transcription of the audible audio signal and a transcription of the other audio. Thus, the transcript data may include a transcript of speech of the remote device and a transcript of speech of a user of the device 202. In these and other embodiments, the transcript data when displayed may include breaks based on a punctuation or carriage return provided by the transcription system.

In some embodiments, the processing system 210 may be configured to implement a diarizing functionality to separate the audible audio signal and the other audio within the third audio data in the single audio channel. Thus, the diarizing functionality may be configured to separate speech obtained from the remote device and speech obtained from a user of the device 202.

In some embodiments, the processing system 210 may direct the audible audio signal to the transcription system such that the transcript data includes the speech from the remote device and does not include the speech from the user of the device 202. Alternately or additionally, the processing system 210 may direct the both the audible audio signal and the other audio to the transcription system but in separate channels. In these and other embodiments, the transcription system may generate first transcript data that includes a transcription of the audible audio signal and second transcript data that includes a transcription of the other audio. In these and other embodiments, when the first and second transcript data are displayed, an indication of the origin of the speech may be presented as well. For example, the first transcript data may be presented closer to one side of the display and the second transcript data may be presented closer to the opposite side of the screen. In another example, the first and second transcript data may be differentiated by different colors, fonts, or other formatting differences. In another example, the first and second transcript data may be preceded by or displayed in proximity to labels such as "first speaker:" and "second speaker," or "local caller:" and "remote caller:," speaker names, speaker aliases, or other tags identifying different speakers.

The diarizing functionality may be implemented by the processing system 210. In short, the diarizing functionality may use differences between the audible audio signal and the other audio to distinguish between the audible audio signal and the other audio. Any information that may indicate what is the source of the audio and/or characteristics of the source of the audio may be useful to the diarizing functionality to distinguish between the audible audio signal and the other audio. Without additional information, the diarizing functionality may be implemented using a blind source separation model. When characteristics of the audible audio signal and/or the other audio signal are available, the diarizing functionality may use the characteristics to assist in separating the audible audio signal and the other audio within the third audio data.

In some embodiments, the characteristics that may be used may include speaker characteristics, such as a tone, frequency, volume, etc. of the speech of the user of the remote device and the user of the device 202.

In some embodiments, the characteristics may include a bandwidth range or sampling rate of the audio. For example, the minimum and/or maximum frequencies of the audible audio signal and the other audio may be different because the audible audio signal and the other audio may originate from different sources. For example, the audible audio signal may be limited to a bandwidth of 300-3600 Hz with a sampling rate of 8 kHz from being transmitted over a network. In contrast, the other audio, captured directly by the microphone 212, may extend from 50-7800 Hz with a sampling rate of 16 kHz.

In some embodiments, the characteristics may include an indication of the CODEC (coder/decoder) used for an audio signal. A different CODEC may be identified based on direct out-of-band messages identifying the coding method or by artifacts such as a buzzing sound, unique background noise level or spectrum, or spectral differences in a signal.

In some embodiments, the characteristics may include an indication from the device 202 whether the speaker 214 is broadcasting such that it may be determined if the third audio signal includes the audible audio signal or the other audio at a particular time.

In some embodiments, the characteristics may include an indication that a user of the device 202 is hard of hearing and thus the other audio may have a higher volume or may include a raspy voice.

In some embodiments, the characteristics may include a voiceprint of the user of the device 202 and/or a voiceprint of a user of the remote device. In these and other embodiments, the device 202 may learn the features of the voice of the user of the device 202 over time to generate a voiceprint of the user of the device 202. The voiceprint may include the user's average pitch, gender, spectral characteristics, and other features. In some embodiments, the voiceprint may be determined during the communication session. Additionally or alternatively, the voiceprint may be determined during a previous communication session. In these and other embodiments, the voiceprint may be further tuned during each communication session. In these and other embodiments, the voiceprint of a user of the remote device may be stored and accessed using an identifier of the remote device that may be provided when commencing the communication session.

In some embodiments, the characteristics may include an age of the user of the device 202 that may be known by the device 202.

In some embodiments, the characteristics may include information from the device 202 and/or the remote device that may indicate if audio is being captured by a microphone or broadcast by the speaker 214.

In some embodiments, the characteristics may include video of the user of the device 202 and the user of the remote device that may indicate which of the user of the device 202 and the user of the remote device may begin to speak, end speaking, and not be speaking Furthermore, lip reading from the video may be used to correlate to the audio and assist in separating audio.

In some embodiments, the diarizing functionality may be implemented in the transcription system instead of at the device 202. In these and other embodiments, the device 202 may provide the third audio data as a single audio channel to the transcription system and the transcription system may perform the diarizing functionality in a similar manner as the device 202 to separate the audible audio signal and the other audio.

In some embodiments, the device 202 may be communicatively coupled to the secondary device 220. In these and other embodiments, the device 202 may be configured to obtain the second audio data in a different manner than capturing the second audio data when the second audio data is broadcast by the speaker 214. In these and other embodiments, the secondary device 220 may be configured to broadcast audio provided to the secondary device 220 from the device 202. In these and other embodiments, when the device 202 obtains the second audio data, within the native applications of the device 202, the device 202 may direct the second audio data to the secondary device 220. The secondary device 220 may broadcast the second audio data and provide a copy of the second audio data back to the device 202. The copy of the second audio data obtained from the secondary device 220 may be accessible by a non-native application running on the processing system 210. As such, the copy of the second audio data may be directed to the transcription system for generation of the transcript data. Note that when the second audio data is obtained from the secondary device 220, the second audio data may not be combined in a single audio channel with audio of a user of the device 202. As a result, no diarizing functionality may be performed by the device 202 when obtaining the audio through the secondary device 220. Obtaining audio through the secondary device 220 may be an example of the secondary device audio conveyance function.

In some embodiments, the device 202 may be configured to perform the application audio conveyance function. For example, the communication unit 216 may be configured to connect with a network, such as an internet protocol (IP) network. Using the IP network, the processing system 210 may configured to perform a communication session following voice-over-IP (VoIP) protocols. In these and other embodiments, an application running on the processing system 210 may handle the communication session following the VoIP protocols. In these and other embodiments, the audio obtained from the communication session may be available to the application to provide to the transcription system to obtain transcript data of the audio. Note that the communication session following the VoIP protocols does not use the phone number associated with the SIM card of the device 202. Rather, a VoIP communication session may use a separate communication address. As such, the application audio conveyance function may not be used by a phone call made or received by the device 202 using the phone number associated with the SIM card of the device 202.

In some embodiments, the audio data and/or the transcript data may be saved by the device 202. In some embodiments, the processing system 210 may store the audio data and/or transcript data locally. Alternately or additionally, the processing system 210 may cause the communication unit 216 to direct the audio data and/or transcript data to a remote server for storing the audio. In some embodiments, the audio data and/or transcript data may be stored after the audible audio signal and the other audio are separated by the diarizing functionality. As such, the audible audio signal, the other audio, and other transcript data may be labeled when stored.

In some embodiments, the audio data and/or transcript data when stored outside of the device 202 may include privacy issues because the audio data and/or transcript data may include personal information regarding the user of the device 202. As such, the audio data and/or transcript data may be stored in a manner to protect the personal information.

In some embodiments, to protect the personal information, the audio data and/or transcript data may be redacted. Alternately or additionally, the audio data and/or transcript data may be encrypted before being sent to the server. Alternately or additionally, only features of the audio data, such as spectral features, may be stored on the server.

Alternately or additionally, only the audio data and/or transcript data, without any identifiers associated with the device 202 and/or the user of the device 202, may be stored outside of the device 202. To allow the device 202 to access the stored audio data and/or transcript data, the device 202 may include a direct link to the stored audio data and/or transcript data. Alternately or additionally, the server may store the audio data and/or transcript data associated with a hashing code that is completely random or from a hashing code generator. The device 202 may send the hashing code to the server to retrieve the audio data and/or transcript data.

In some embodiments, the hashing code may be associated with a password. The device 202 may provide the hashing code and the password. In these and other embodiments, the server may provide access in response to the hashing code and password matching.

As another example, an identifier and a password may be combined and hashed. The combined hashed information may be provided to the server to access the stored information. In these and other embodiments, the links and/or hashed values may be stored to allow access to the information on the server if the device 202 is unavailable.

Modifications, additions, or omissions may be made to the environment 200 without departing from the scope of the present disclosure. For example, in some embodiments, the device 202 may include one or more ASR modules that may be executed by the processing system 210 to cause the device 202 to generate the transcript data. In these and other embodiments, the device 202 may not provide any audio data to a transcription system. Alternately or additionally, the device 202 may not include the display 218. In these and other embodiments, the device 202 may be coupled to a separate display to which the device 202 may provide the transcript data for presentation. Alternately or additionally, the environment 200 may not include the secondary device 220.

Figure 3:
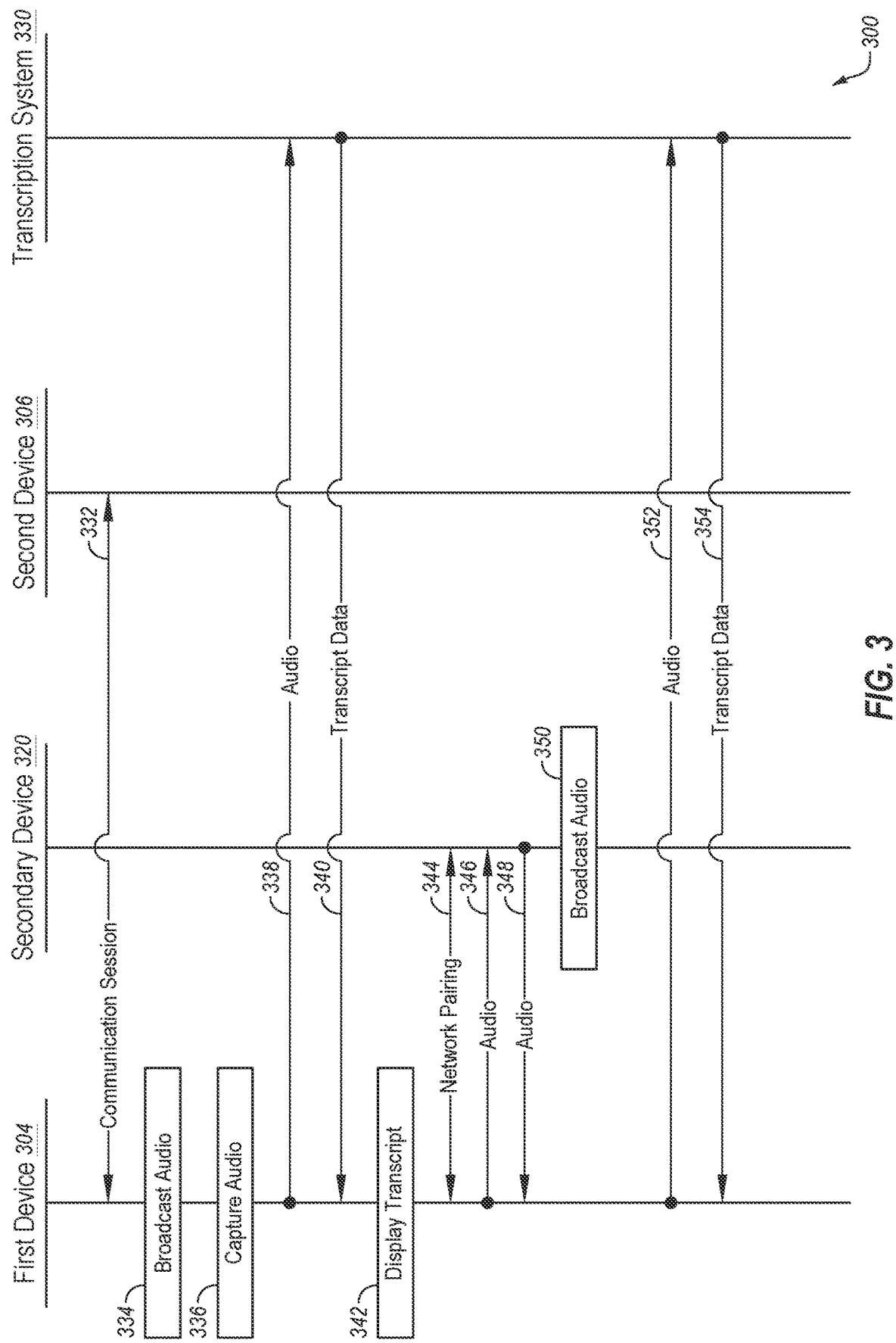
FIG. 3 illustrates example operations related to transcription generation.

FIG. 3 illustrate example operations 300 related to transcription generation. The operations 300 may be arranged in accordance with at least one embodiment described in the present disclosure. In the illustrated example, the operations 300 may be between a first device 304, a second device 306, a secondary device 320, and a transcription system 330. In some embodiments, the first device 304, the second device 306, and the transcription system 330 may be analogous to the first device 104, the second device 106, and the transcription system 130, respectively, of FIG. 1. Alternately or additionally, the secondary device 320 may be analogous to the secondary device 220 of FIG. 2. Accordingly, no further explanation is provided with respect thereto. Alternatively or additionally, the operations 300 may be an example of the operation of the elements of the environment of FIGS. 1 and/or 2.

In some embodiments, the operations 300 may be an example of communications and interactions between the first device 304, the second device 306, the secondary device 320, and the transcription system 330. In some embodiments, the interactions between the first device 304, the second device 306, the secondary device 320, and the transcription system 330 may occur over one or more networks, such as the network 102. As another example, the first device 304 and the second device 306 may be communicatively coupled over a first network, such as a POTS network or cellular network. In these and other embodiments, the first device 304 and the secondary device 320 may be communicatively coupled over a second network, such as a short-range wireless network, such as an 802.11 network, Bluetooth® network, or other short-range wireless network. In these and other embodiments, the first device 304 and the transcription system 330 may be communicatively coupled over a third network, such as an internet protocol (IP) network.

Generally, the operations 300 may relate to generating transcriptions of communications between the first device 304 and the second device 306. The operations 300 illustrated are not exhaustive but are merely representative of operations 300 that may occur. Furthermore, one operation as illustrated may represent one or more communications, operations, and/or data exchanges.

Furthermore, the operations 300 may illustrate the audio capture audio conveyance function and the secondary device audio conveyance function. For example, the operations of 334, 336, 338, 340, and 342, and in particular operations 336 and 338, may describe the audio capture audio conveyance function that may be performed by the first device 304. The operations 344, 346, 348, 350, 352, and 354, and in particular operations 348 and 352 may describe the secondary device audio conveyance function that may be performed by the first device 304.

In some embodiments, the first device 304 may be configured to select between the audio capture audio conveyance function and the secondary device audio conveyance function. As an example as illustrated, the first device 304 may select the secondary device audio conveyance function when the secondary device 320 is paired with the first device 304. When the secondary device 320 is not paired with the first device 304 the first device 304 may select the audio capture audio conveyance function. As illustrated in FIG. 3, before the operation 332, the secondary device 320 may not be paired with the first device 304. As a result, the first device 304 may implement the audio capture audio conveyance function during some of the operations 300.

At operation 332, a communication session may be established between the first device 304 and the second device 306. During the communication session, first audio data obtained by the first device 304 may be directed to the second device 306. The first audio data may be obtained by a microphone of the first device 304. Also, during the communication session, second audio data may be obtained by the second device 306 and may be directed to the first device 304. The second audio data may include speech of a user of the second device 306.

At operation 334, the first device 304 may be configured to audibly broadcast the second audio data of the communication session obtained from the second device 306. Broadcasting the second audio data may be performed by a speaker of the first device 304 and may include audibly broadcasting an audio signal based on the second audio data obtained from the second device 306.

At operation 336, the first device 304 may capture the audio signal broadcast by the speaker of the first device 304. The microphone of the first device 304 may capture the audio signal and may generate third audio data based on the audio signal. Note that the microphone of the first device 304 may generate first audio data to send to the second device 306 based on speech of a user of the first device 304 and may generate third audio data based on the second audio data obtained from the second device 306 and broadcast by the speaker of the first device 304.

At operation 338, the first device 304 may be configured to direct the third audio data generated in operation 336 to the transcription system 330. In some embodiments, the first device 304 may send both the third audio data and the first audio data to the transcription system 330. In these and other embodiments, the first device 304 may send all audio captured by the microphone of the first device 304 to the transcription system 330. Alternately or additionally, the first device 304 may separate the first audio data and the third audio data and send only the third audio data to the transcription system 330. In some embodiments, the first device 304 may be further configured to separate the first audio data and the third audio data and send only the first audio data to the second device 306. For example, the first device 304 may include a filter, such as an echo cancellation filter, that may remove the third audio data such that only the first audio data is directed to the second device 306 during the communication session.

To direct the third audio data to the transcription system 330, the first device 304 may establish a network connection with the transcription system 330 using networking protocols, passwords, or other procedures to establish the network connection. After establishing a network connection, a transcription session may be established by the transcription system 330 to generate transcript data of the third audio data. The transcript data may include a transcription of the third audio data.

Alternately or additionally, the transcription system 330 may obtain the first audio data and the third audio data from the first device 304. In these and other embodiments, the first audio data and the third audio data may be combined in a single audio channel that is provided by the first device 304 to the transcription system 330. In these and other embodiments, the transcript data may include a transcription of the first audio data and the third audio data. As a result, the transcript data may include a transcription of both the speech of a user of the second device 306 and speech of a user of the first device 304. Alternately or additionally, the transcription system 330 may separate the third audio data from the first audio data in the single audio channel and generate a transcription of the third audio data and not generate a transcription of the first audio data.

At operation 340, the transcription system 330 may direct the transcript data generated by the transcription session to the first device 304.

At operation 342, the first device 304 may be configured to display a transcription included in the transcript data. The first device 304 may be configured to display the transcription in substantially real-time or real-time in coordination with the first device 304 audibly broadcasting the audio signal in operation 334. In some embodiments, the first device 304 may display a transcription of the third audio data, the first audio data, or both the third audio data and the first audio data.

At operation 344, the first device 304 and the secondary device 320 may be paired over a short-range wireless network. In some embodiments, the first device 304 and the secondary device 320 may be paired in response to the first device 304 and the secondary device 320 both being within range of the short-range wireless network. In these and other embodiments, the short-range wireless network may by a Bluetooth® network. In these and other embodiments, when the first device 304 and the secondary device 320 are within a particular range of each other the first device 304 and the secondary device 320 may be paired over the short-range wireless network. In these and other embodiments, the first device 304 may be a mobile device such as a mobile phone and the secondary device 320 may be a device configured to broadcast audio of a communication session, such as an audio induction loop, headphones, a headset, or a speaker, among other devices.

The pairing of the first device 304 and the secondary device 320 may include communicatively coupling the first device 304 and the secondary device 320. In these and other embodiments, the pairing of the first device 304 and the secondary device 320 may allow the first device 304 and the secondary device 320 to share audio therebetween. For example, when the first device 304 is configured to broadcast audio, the first device 304 may send the audio to the secondary device 320.

In response to the pairing of the first device 304 and the secondary device 320, the first device 304 may be configured to select the secondary device audio conveyance function. As such, the first device 304 may stop implementing the audio capture audio conveyance function and start implementing the secondary device audio conveyance function as described by the operations 344, 346, 348, 350, 352, and 354.

At operation 346, the first device 304 may direct the second audio data, from the communication session with the second device 306, to the secondary device 320. The first device 304 may direct the remote audio to the secondary device 320 using the short-range wireless network based on the communication protocol established during the network pairing of the operation 344.

At operation 348, the secondary device 320 may direct the second audio data from the communication session with the second device 306 back to the first device 304. In these and other embodiments, the first device 304 may be configured to allow for the second audio data to be directed to the secondary device 320. However, the first device 304 may not be configured to allow an application running on the first device 304 to access the second audio data and direct the second audio data to the transcription system 330. However, after the second audio data is provided back to the first device 304 from the secondary device 320, the first device 304 may access the second audio data and provide the second audio data to the transcription system 330.

Note that obtaining the second audio data from the secondary device 320 may replace capturing the second audio data broadcast by the first device 304. In these and other embodiments, the first device 304 may stop capturing the second audio data broadcast by the first device 304 and start obtaining the second audio data from the secondary device 320 in response to the first device 304 implementing the secondary device audio conveyance function instead of the audio capture audio conveyance function.

At operation 350, the secondary device 320 may be configured to audibly broadcast the second audio data of the communication session obtained from the second device 306. Broadcasting the second audio data may be performed by a speaker of the secondary device 320 and may include audibly broadcasting an audio signal based on the second audio data obtained from the second device 306.

At operation 352, the first device 304 may be configured to direct the second audio data from the secondary device 320 to the transcription system 330.

At operation 354, the transcription system 330 may direct a transcript data that may include a transcription of the second audio data to the first device 304. The first device 304 may display the transcription included in the transcript data in a similar manner as in operation 342.

Modifications, additions, or omissions may be made to the operations 300 without departing from the scope of the present disclosure. For example, the operations 300 may not include the operations for the secondary device audio conveyance function. For example, the secondary device 320 may not be paired with the first device 304. As another example, the operations 300 may not include the operations for the audio capture audio conveyance function. As a result, the operations 334, 336, 338, 340, and 342 may not occur. In these and other embodiments, the operations may be arranged in a different order or performed at the same time. For example, when the operations for the audio capture audio conveyance function do not occur, the operation 344 may occur before the operation 332. Alternately or additionally, the operation 350 may occur after the operation 352.

Alternately or additionally, some operations may occur at the same time or in substantially overlapping time periods and/or may be performed in an ongoing basis. For example, the operations 350, 352, and 354 may occur in substantially overlapping time periods.

Figure 4:
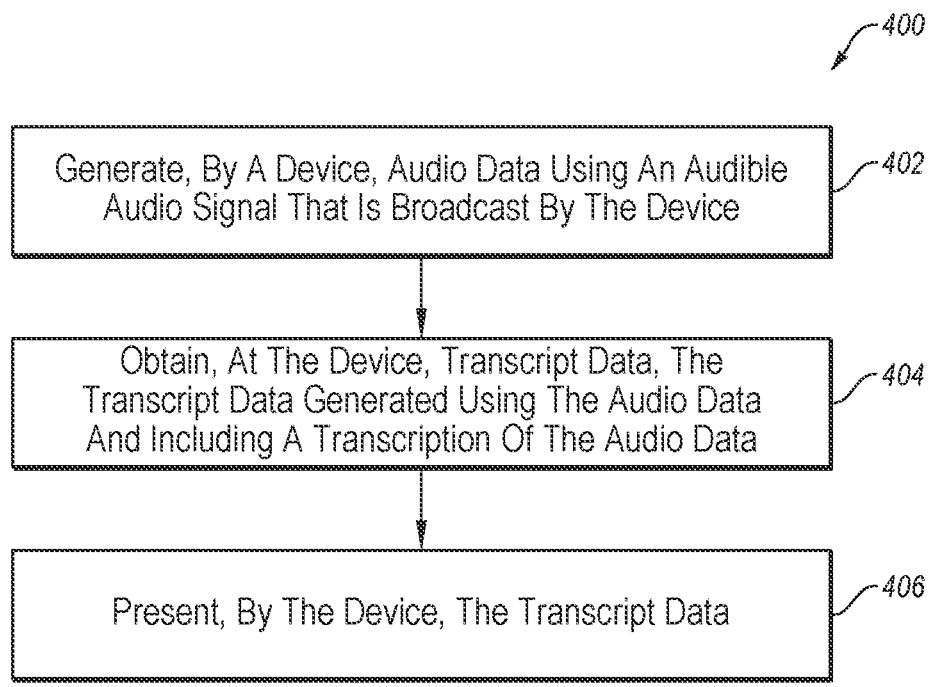
FIG. 4 illustrates a flowchart of an example method to generate transcriptions.

FIG. 4 illustrates a flowchart of an example method 400 to generate transcriptions. The method 400 may be arranged in accordance with at least one embodiment described in the present disclosure. One or more operations of the method 400 may be performed, in some embodiments, by a device or system, such as the first device 104 of FIG. 1, the device 202 of FIG. 2, or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audio data may be generated by a device using an audible audio signal that is broadcast by the device.

At block 404, transcript data may be obtained at the device. The transcript data may be generated using the audio data and may include a transcription of the audio data.

At block 406, the transcript data may be presented by the device. In some embodiments, obtaining the transcript data may include generating the transcript data using a speech recognition algorithm and the audio data. Alternately or additionally, the transcript data may be presented in substantially real-time with the broadcasting of the audible audio signal by the device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include directing the audio data to a transcription system. In these and other embodiments, the transcript data may be obtained by the device from the transcription system. Alternately or additionally, the method 400 may further include receiving, at the device, second audio data that may be used by the device to broadcast the audible audio signal. In these and other embodiments, the second audio data may result from a communication session between the device and a remote device. In these and other embodiments, the second audio data may originate at the remote device.

Alternately or additionally, the method 400 may further include generating, by the device, second audio data that may not be based on the audible audio broadcast by the device. In these and other embodiments, the transcript data may include the transcription for the audio data and may not include a transcription of the second audio data. Alternately or additionally, the transcript data may include first transcript data for the audio data and second transcript data for the second audio data.

Figure 5:
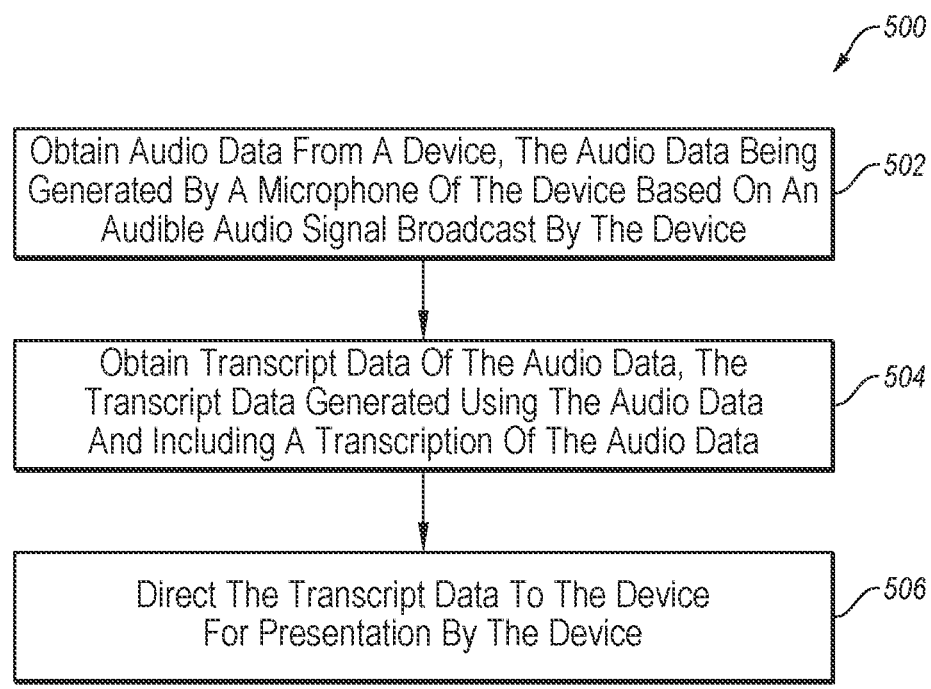
FIG. 5 illustrates a flowchart of another example method to generate transcriptions.

FIG. 5 illustrates a flowchart of an example method 500 to generate transcriptions. The method 500 may be arranged in accordance with at least one embodiment described in the present disclosure. One or more operations of the method 500 may be performed, in some embodiments, by a device or system, such as the transcription system 130 of FIG. 1 or another system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where audio data may be obtained from a device. In some embodiments, the audio data may be generated by a microphone of the device based on an audible audio signal broadcast by the device.

At block 504, transcript data of the audio data may be obtained. The transcript data may be generated using the audio data and including a transcription of the audio data. At block 506, the transcript data may be directed to the device for presentation by the device.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
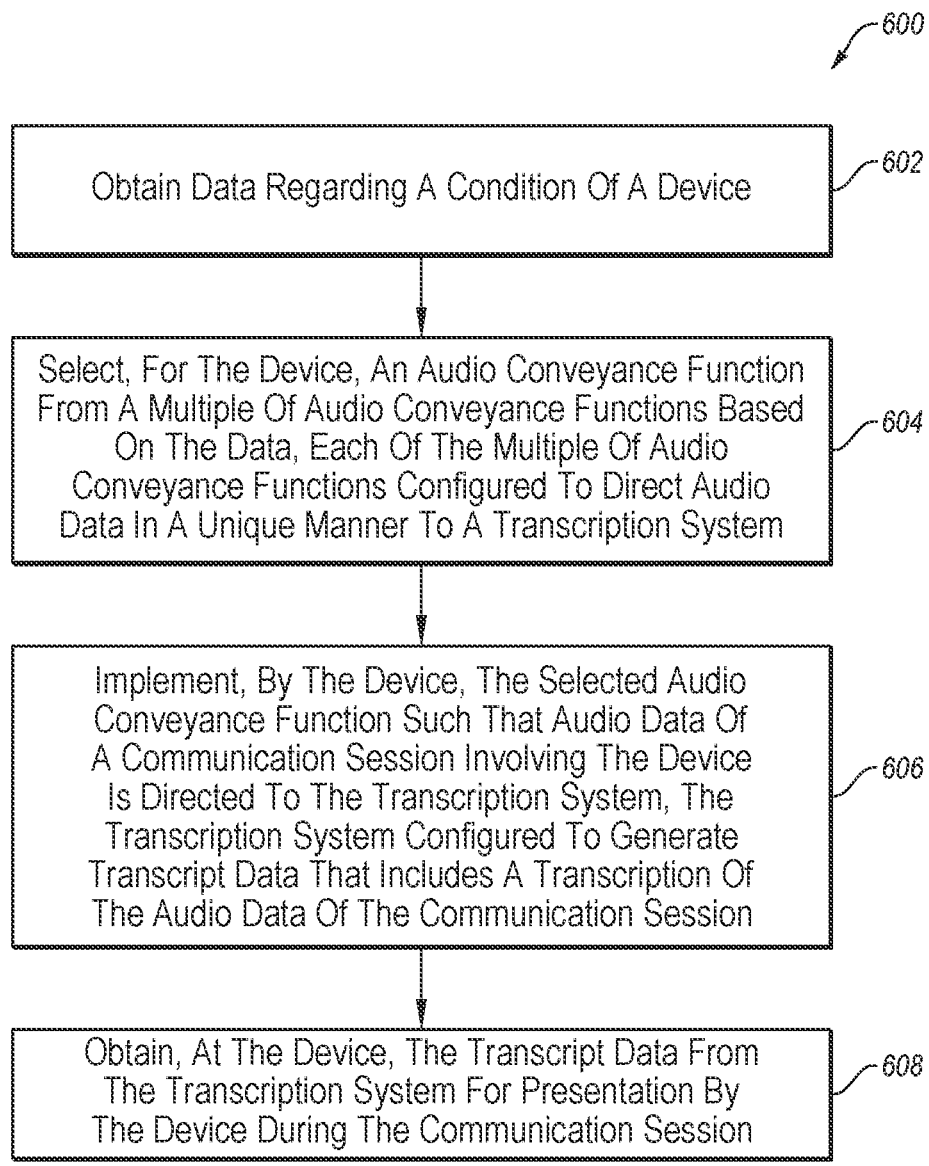
FIG. 6 illustrates a flowchart of another example method to generate transcriptions.

FIG. 6 illustrates a flowchart of an example method 600 to generate transcriptions. The method 600 may be arranged in accordance with at least one embodiment described in the present disclosure. One or more operations of the method 600 may be performed, in some embodiments, by a device or system, such as the first device 104 of FIG. 1, the transcription system 130 of FIG. 1, the device 202 of FIG. 2, or another device or system or combination of devices. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where data regarding a condition of a device may be obtained. In some embodiments, the condition of the device may include one or more of: an ambient noise level surrounding the device, access to the audio data of the communication session by a third-party application, secondary devices directly networked with the device, and a signal quality of a data signal obtained by the device.

At block 604, an audio conveyance function from multiple audio conveyance functions may be selected for the device based on the data. In some embodiments, each of the multiple audio conveyance functions may be configured to direct audio data in a unique manner to a transcription system.

In some embodiments, one of the multiple audio conveyance functions may include establishing the communication session via a remote server associated with the transcription system. In these and other embodiments, the remote server may be configured to direct the audio data to the transcription system.

In some embodiments, one of the multiple audio conveyance functions may include obtaining the audio directly from the native phone application.

In some embodiments, one of the multiple audio conveyance functions may include directing, by the device, the audio data of the communication session to another device configured to audibly broadcast the audio data and receiving the audio data from the other device. In these and other embodiments, the one of the multiple audio conveyance functions may further include directing the audio data received from the other device to the transcription system.

In some embodiments, one of the multiple audio conveyance functions may include in response to the communication session, obtaining, at the device, a request for a second communication session with the transcription system and merging the communication session and the second communication session such that the audio data of the communication session is received at the transcription system.

In some embodiments, one of the multiple audio conveyance functions may include directing, by the device, a service provider of the device to direct communication requests to a communication address unassociated with the service provider such that the communication session occurs using the communication address. The one of the multiple audio conveyance functions may further include directing, by the device, the audio data of the communication session to the transcription system.

In some embodiments, one of the multiple audio conveyance functions may include generating, by a microphone of the device, the audio data of the communication session using an audible audio signal that is broadcast by a speaker of the device and directing the audio data to the transcription system.

At block 606, the selected audio conveyance function may be implemented by the device such that audio data of a communication session involving the device is directed to the transcription system. In some embodiments, the transcription system may be configured to generate transcript data that includes a transcription of the audio data of the communication session. In some embodiments, the communication session may be between the device and a remote device, and the audio data may originate at the remote device. An example of the remote device may be the second device 106 of FIG. 1.

At block 608, the transcript data from the transcription system may be obtained at the device for presentation by the device during the communication session.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 600 may further include generating, by the device, second audio data that is not based on the audible audio broadcast by the device. In some embodiments, the transcript data may include the transcription for the audio data and may not include a transcription of the second audio data. Alternately or additionally, the transcript data may include first transcript data for the audio data and second transcript data for the second audio data.

Figure 7:
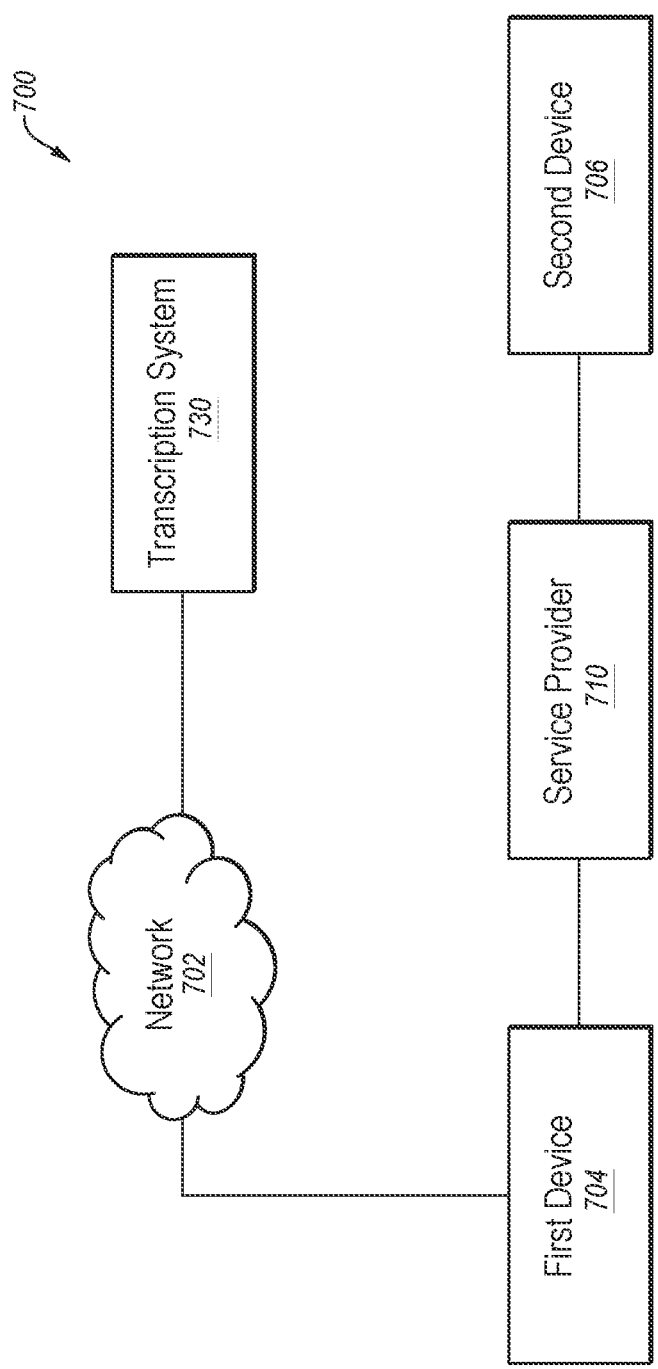
FIG. 7 illustrates another example environment for transcription generation.

FIG. 7 illustrates an example environment 700 for transcription generation. The environment 700 may be arranged in accordance with at least one embodiment described in the present disclosure. The environment 700 may include a network 702, a first device 704, a second device 706, a service provider 710, and a transcription system 730. The environment 700 may illustrate elements that may be used to perform the redirect audio conveyance function discussed previously. The network 702, the first device 704, the second device 706, and the transcription system 730 may be analogous to the network 102, the first device 104, the second device 106, and the transcription system 130 of FIG. 1. Thus, no further description is provided with respect to FIG. 7 except to explain how the elements may function differently in this and other embodiments.

The service provider 710 may include any suitable system or device, including hardware and software, relay devices, base stations, network and telephone switches, communication endpoints, etc., configured to provide telecommunication services. The service provider 710 may utilize any suitable network to provide the telecommunication services. Furthermore, the service provider 710 may include any suitable hardware and/or software configured to perform the operations described herein with respect to the service provider 710. For example, the service provider 710 may include code and routines configured to enable a computing device to perform one or more of the described operations. Additionally or alternatively, the service provider 710 may include one or more processors and one or more computer-readable media.

An example of the operation of the environment 700 is now provided. In some embodiments, the first device 704 or another system such as the transcription system 730 or a call forwarding server, not illustrated, may communicate a message to the service provider 710. The message may include information that may be used to redirect calls from a first communication address of the first device 704 to a second communication address of the first device 704. For example, the first communication address may be phone number associated with a SIM card of the first device 704 and the native dialer of the first device 704. The second communication address may be a VoIP phone number that may be associated with an application on the first device 704, such as a VoIP application or softphone. The redirect may be an example of a setting up or ending call forwarding of the first device 704.

In response to the message, the service provider 710 may activate or deactivate call forwarding according to the information included in the message. After the call forwarding has been enabled, for an inbound call from the second device 706, the service provider 710 may forward the inbound call to the second communication address of the first device 704 such that an audio connection between the first device 704 and the second device 706 may be established. The audio connection may be controlled by an application on the first device 704 and not the native dialer of the first device 704. As a result, the application on the first device 704 may access audio data obtained from the second device 706.

In some embodiments, the application may direct the audio data obtained from the second device 706 to the transcription system 730 through the network 702. In these and other embodiments, the transcription system 730 may generate transcript data that includes a transcription of the audio data and direct the transcript data to the first device 704 for presentation by the first device 704.

In some embodiments, a user of the first device 704 may use the application to send communication requests and establish a communication session with the second device 706. As a result, the application may access the audio from an outbound call from the first device 704 to the second device 706.

In some embodiments, the first device 704 may be configured to perform the audio capture audio conveyance function and the secondary device audio conveyance function described with respect to FIGS. 1 and 2. In these and other embodiments, the first device 704 may be configured to select between the different audio conveyance functions based on conditions of the device and the cost structures for the audio conveyance functions.

As an example, the first device 704 may consider the cost of maintaining a second communication address. In response to the cost being above a threshold, the first device 704 may select one of the audio capture audio conveyance function and the secondary device audio conveyance function before selecting the redirect audio conveyance function. For example, the first device 704 may consider ambient noise conditions and secondary device connections to select between the audio capture audio conveyance function and the secondary device audio conveyance function. For example, in response to a secondary device being connected to the first device 704, the first device 704 may select the secondary device audio conveyance function. In response to a secondary device not being connected to the first device 704, the first device 704 may determine an ambient noise level. In response to the ambient noise level being below a threshold, the first device 704 may select the audio capture audio conveyance function. The threshold may be based on a noise level that may allow speech of a person to maintain a discernible level in the audio data. In response to the ambient noise level being at or above the threshold, the first device 704 may select the redirect audio conveyance function.

In some embodiments, in response to selecting the redirect audio conveyance function, the first device 704 may request the service provider 710 to redirect communication requests to the first communication address of the first device 704 to the second communication address of the first device 704. In these and other embodiments, the first device 704 may have a second communication address already associated with the first device 704. Alternately or additionally, the first device 704 may request the second communication address be established. For example, the transcription system 730 may maintain a pool of second communication addresses that may be used by devices. In these and other embodiments, the first device 704 may request a number and obtain a second communication address. The first device 704 may indicate the second communication address to the service provider 710 when requesting the redirect of communication requests. In these and other embodiments, in response to selecting the redirect audio conveyance function, the first device 704 may also request the second communication address from the pool of second communication addresses in response to a request from a user of the first device 704 to initiate a communication session with the second device 706. In these and other embodiments, the first device 704 may use the second communication address to establish a communication session with the second device 706. After obtaining the second communication address, the first device 704 may provide the second communication address to the service provider 710 when requesting the redirect of communication requests.

Modifications, additions, or omissions may be made to the environment 700 without departing from the scope of the present disclosure. For example, in some embodiments, the environment 700 may include additional elements, such as a redirect server or other server that may assist in performing the redirect audio conveyance function.

Figure 8:
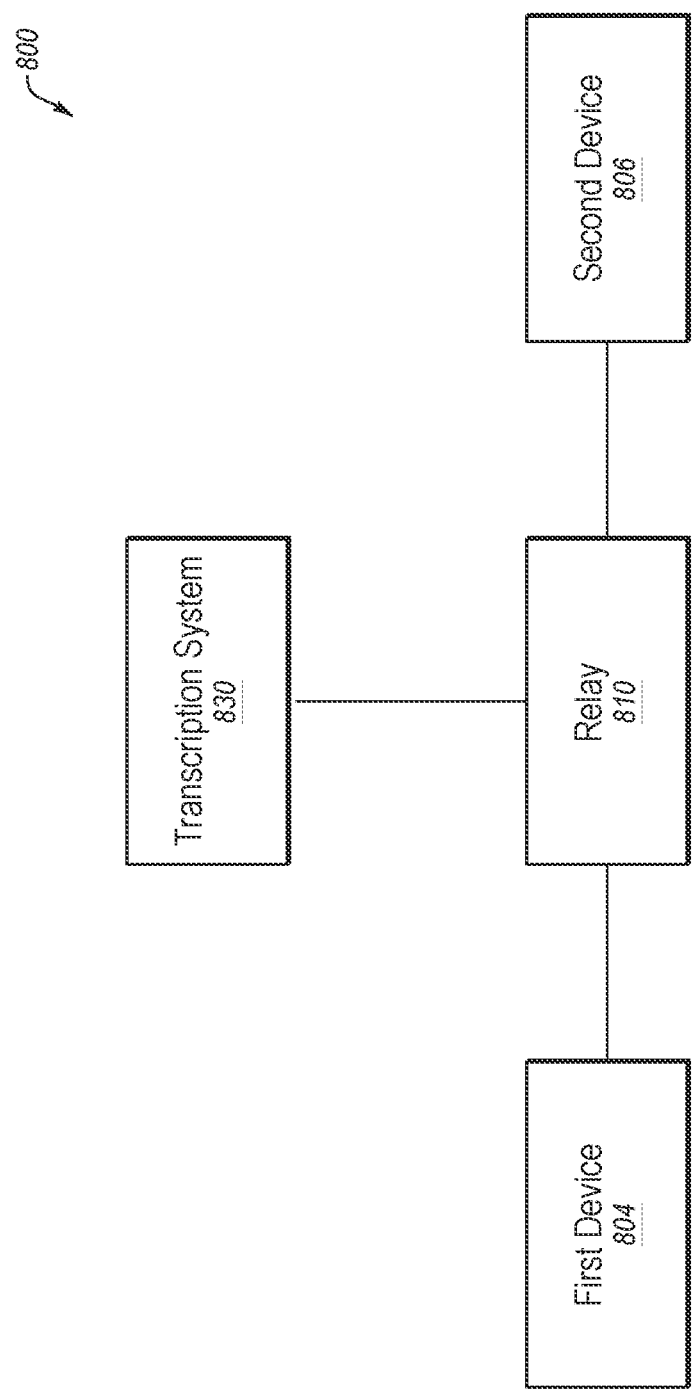
FIG. 8 illustrates another example environment for transcription generation.

FIG. 8 illustrates an example environment 800 for transcription generation. The environment 800 may be arranged in accordance with at least one embodiment described in the present disclosure. The environment 800 may include a first device 804, a second device 806, a relay 810, and a transcription system 830. The environment 800 may illustrate elements that may be used to perform the relay audio conveyance function discussed previously.

The first device 804, the second device 806, and the transcription system 830 may be analogous to the first device 104, the second device 106, and the transcription system 130, respectively, of FIG. 1. Thus, no further description is provided with respect to FIG. 8 except to explain how the elements may function differently in this and other embodiments.

The relay 810 may include any suitable system or device, including hardware and software configured to provide relay telecommunication services. The relay 810 may utilize any suitable network to relay the telecommunication services. Furthermore, the relay 810 may include any suitable hardware and/or software configured to perform the operations described herein with respect to the relay 810. For example, the relay 810 may include code and routines configured to enable a computing device to perform one or more of the described operations. Additionally or alternatively, the relay 810 may include one or more processors and one or more computer-readable media. The relay 810 may be configured to relay audio communications between the first device 804 and the second device 806.

An example of the operation of the environment 800 is now provided. The first device 804 may establish a communication session with the second device 806 by initially sending a communication request to the relay 810. After a communication session is established between the relay 810 and the first device 804, the first device 804 may provide a communication address, such as a phone number, of the second device 806 to the relay 810. The relay 810 may send a communication request to the second device 806. After establishing the communication request with the second device 806, the relay 810 may link the first device 804 and the second device 806 through the relay 810. As a result, audio data that is part of the communication session between the first device 804 and the second device 806 may be obtained by the relay 810.

In an analogous manner, the second device 806 may establish a communication session with the first device 804 by initially sending a communication request to the relay 810. After a communication session is established between the relay 810 and the second device 806, the second device 806 may provide a communication address, such as a phone number, of the first device 804 to the relay 810. The relay 810 may send a communication request to the first device 804. After establishing the communication request with the first device 804, the relay 810 may link the first device 804 and the second device 806 through the relay 810. As a result, audio data that is part of the communication session between the first device 804 and the second device 806 may be obtained by the relay 810.

In some embodiments, the relay 810 may direct the audio data obtained during a communication session to the transcription system 830. In these and other embodiments, the relay 810 may direct the audio data that originates at the second device 806 and/or the audio data that originates at the first device 804.

In some embodiments, the transcription system 830 may generate transcript data of the audio data obtained from the relay 810. In these and other embodiments, the transcription system 830 may direct the transcript data to the relay 810. In some embodiments, after obtaining the transcript data, the relay 810 may direct the transcript data to the first device 804 and/or the second device 806. In these and other embodiments, the relay 810 may direct the transcript data using the network connection between the first device 804 and the relay 810 used for the communication session or using a separate network connection. Alternately or additionally, a network connection may be established between the transcription system 830 and the first device 804 and/or the second device 806 to allow the transcription system 830 to direct the transcript data directly to the first device 804 and the second device 806 without passing through the relay 810.

In some embodiments, the first device 804 may be configured to perform the audio capture audio conveyance function and the secondary device audio conveyance function described with respect to FIGS. 1 and 2. In these and other embodiments, the first device 804 may be configured to select between the different audio conveyance functions based on conditions of the device and the cost structures for the audio conveyance functions.

As an example, when an application associated with the transcription system 830 is first executed on the first device 804, the application may determine conditions of the first device 804. Based on the conditions of the first device 804, the application may determine that one of the audio capture audio conveyance function or the secondary device audio conveyance function may be used. In response to neither of the audio capture audio conveyance function or the secondary device audio conveyance function being available, such as in response to audio from the microphone not being available during a communication session with the native dialer and no secondary device being available to be coupled to the first device 804, the application may provide information to a user to implement the relay audio conveyance function.

Modifications, additions, or omissions may be made to the environment 800 without departing from the scope of the present disclosure.

Figure 9:
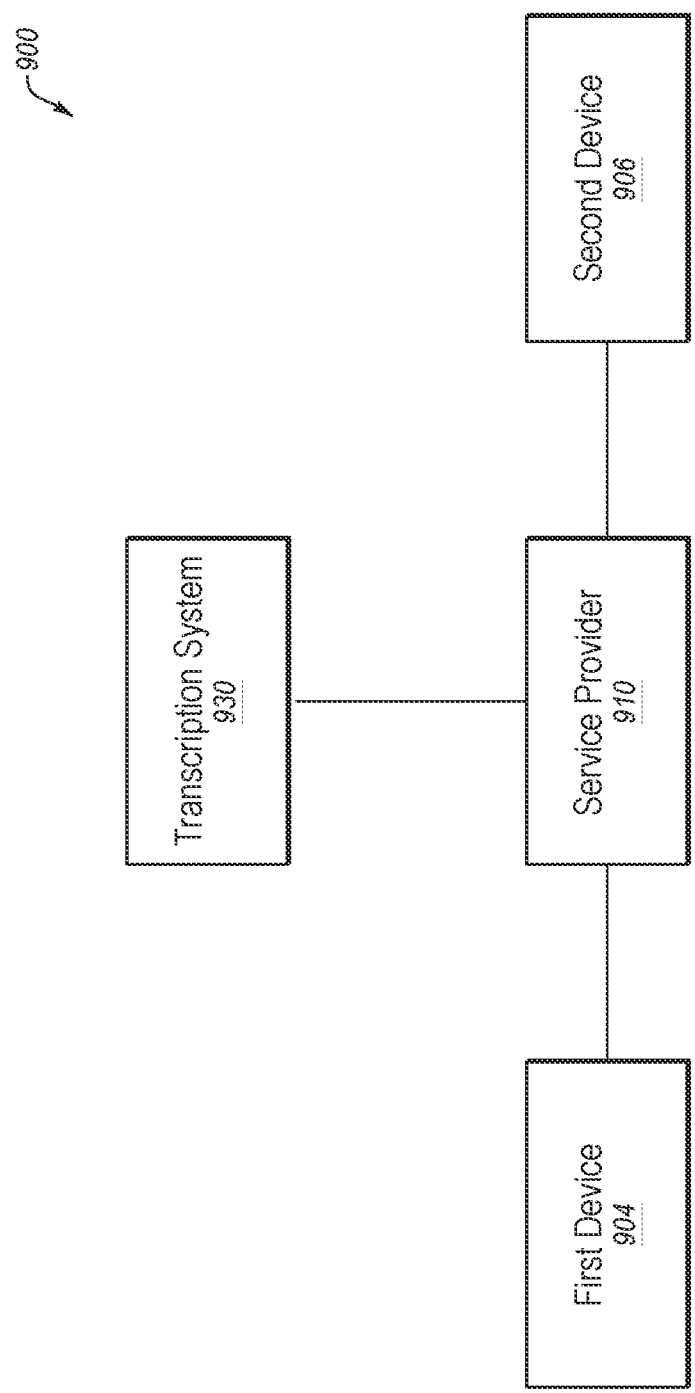
FIG. 9 illustrates another example environment for transcription generation.

FIG. 9 illustrates an example environment 900 for transcription presentation. The environment 900 may be arranged in accordance with at least one embodiment described in the present disclosure. The environment 900 may include a first device 904, a second device 906, a service provider 910, and a transcription system 930. The environment 900 may illustrate elements that may be used to perform the conference audio conveyance function discussed previously.

The network 902, the first device 904, the second device 906, and the transcription system 930 may be analogous to the network 102, the first device 104, the second device 106, and the transcription system 130, respectively, of FIG. 1. Thus, no further description is provided with respect to FIG. 9 except to explain how the elements may function differently in this and other embodiments.

The service provider 910 may include any suitable system or device, including hardware and software, relay devices, base stations, communication endpoints, etc., configured to provide telecommunication services. The service provider 910 may utilize any suitable network to provide the telecommunication services. Furthermore, the service provider 910 may include any suitable hardware and/or software configured to perform the operations described herein with respect to the service provider 910. For example, the service provider 910 may include code and routines configured to enable a computing device to perform one or more of the described operations. Additionally or alternatively, the service provider 910 may include one or more processors and one or more computer-readable media.

An example of the operation of the environment 900 is now provided. In some embodiments, the first device 904 and the second device 906 may establish a communication session. In response to the communication session being established, the first device 904 may provide a request to the transcription system 930 to establish a communication session with the first device 904. The transcription system 930 may request to establish a communication session with the first device 904 by way of the service provider 910. The communication session from the transcription system 930 may use a communication address already associated with the first device 904 or it may use a communication address selected from a pool of communication addresses as described with reference to FIG. 7. The service provider 910 may provide an indication of the request from the transcription system 930 to the first device 904. The first device 904 may request that the service provider 910 establish a three-way call or conference call such that the communication session is established between the first device 904 and the transcription system 930 and merged with the communication session between the transcription system 930 and the first device 904. As a result, the audio data shared between the first device 904 and the second device 906 during the communication session may also be provided to the transcription system 930 by way of the service provider 910. In some embodiments, the first device 904 may automatically merge the two communication sessions. In some embodiments, the first device 904 may provide a visual or audible prompt to a user of the first device 904 to manually merge the two communication sessions such as by selecting an option on a display of the device 904. In these and other embodiments, the transcription system 930 may not provide any audio data to the communication session but may only capture audio data from the communication session. Note that the audio obtained from the transcription system 930 may not indicate an origin and may be single channel audio. As a result, the transcription system 930 may using the diarizing functionality as described with respect FIG. 2 to distinguish between audio data originating at the second device 906 and audio data originating at the first device 904. The transcription system 930 may generate transcript data of the audio data and provide the transcript data to the first device 904 and/or the second device 906.

In some embodiments, an application running on the first device 904 may be configured to automatically direct the service provider 910 to establish the three-way call with the transcription system 930.

In some embodiments, the first device 904 may be configured to perform any of the audio capture audio conveyance functions described with respect to FIGS. 1 and 2. In these and other embodiments, the first device 904 may be configured to select between the different audio conveyance functions based on conditions of the device and the cost structures for the audio conveyance functions.

As an example, the first device 904 may take into consideration the cost of maintaining a second communication address. Based on a cost, the first device 904 may select to not perform the application audio conveyance function nor the redirect audio conveyance function. In these and other embodiments, the first device 904 may further consider a preference of a user and thus not select to perform the relay audio conveyance function. Additionally, the first device 904 may determine that no secondary device is available and thus may not select the secondary device audio conveyance function. In these and other embodiments, the first device 904 may select between the audio capture audio conveyance function and the conference audio conveyance function. To select between the two functions, the first device 904 may consider ambient noise conditions. In response to the ambient noise level being below a threshold, the first device 904 may select the audio capture audio conveyance function. In response to the ambient noise level being at or above the threshold, the first device 904 may select the conference audio conveyance function. Modifications, additions, or omissions may be made to the environment 900 without departing from the scope of the present disclosure.

Figure 10:
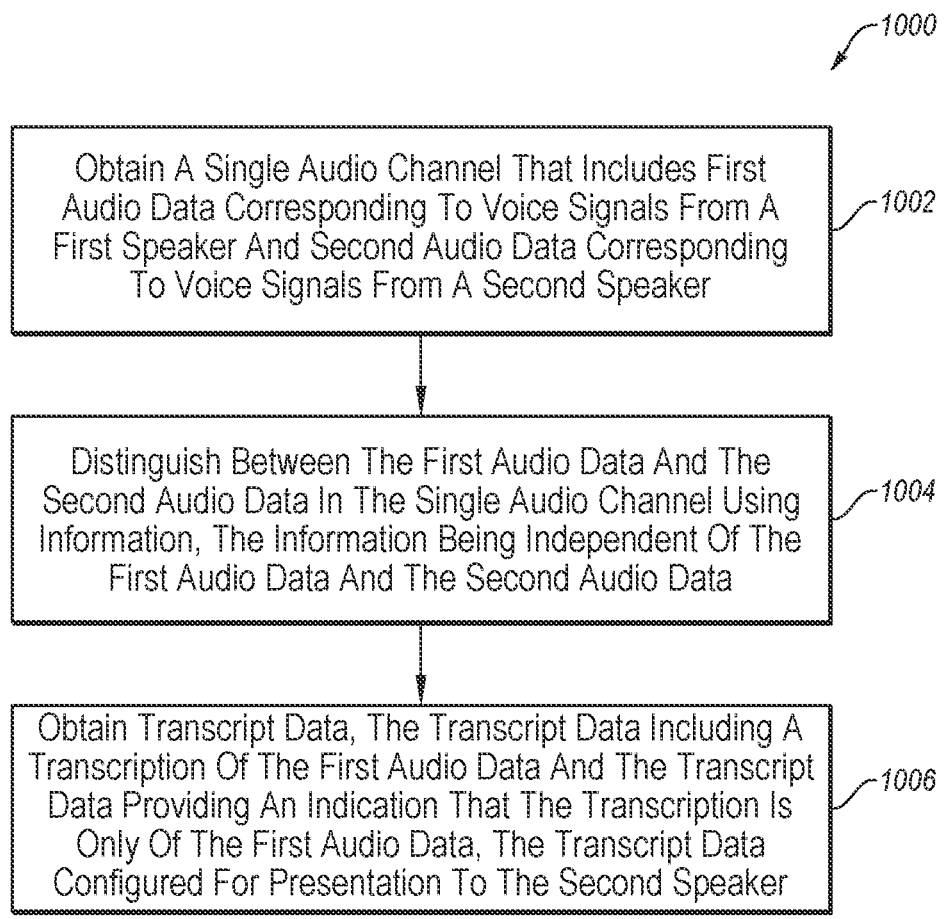
FIG. 10 illustrates a flowchart of another example method to generate transcriptions.

FIG. 10 illustrate a flowchart of an example method 1000 to generate transcriptions. The method 1000 may be arranged in accordance with at least one embodiment described in the present disclosure. One or more operations of the method 1000 may be performed, in some embodiments, by a device or system, such as the first device 104 of FIG. 1, the transcription system 130 of FIG. 1, the device 202 of FIG. 2, or another device or system or combination of devices. In these and other embodiments, the method 1000 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1000 may begin at block 1002, where a single audio channel may be obtained. The signal audio channel may include first audio data corresponding to voice signals from a first speaker and second audio data corresponding to voice signals from a second speaker.

At block 1004, the first audio data and the second audio data in the single audio channel may be distinguished therebetween using information. In some embodiments, the information may be independent of the first audio data and the second audio data. In some embodiments, the information may include one or more of: a format used by a CODEC for the first audio data and/or second audio data, camera signals, previously determined voiceprints of the second speakers and/or first speaker, signals indicating which speaker is speaking, voice activity detector info, and/or an indication that the second speaker is hard of hearing.

At block 1006, transcript data may be obtained. The transcript data may include a transcription of the first audio data. In some embodiments, the transcript data may provide an indication that the transcription is only of the first audio data and the transcript data may be configured for presentation to the second speaker.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 11:
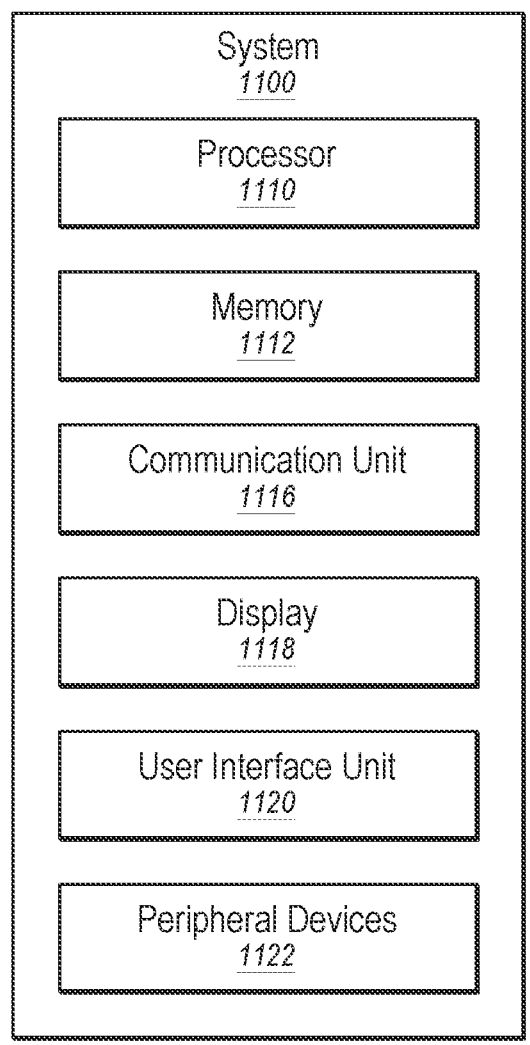
FIG. 11 illustrates an example system that may be used during transcription generation.

FIG. 11 illustrates an example system 1100 that may be used during transcription presentation. The system 1100 may be arranged in accordance with at least one embodiment described in the present disclosure. The system 1100 may include a processor 1110, memory 1112, a communication unit 1116, a display 1118, a user interface unit 1120, and a peripheral device 1122, which all may be communicatively coupled. In some embodiments, the system 1100 may be part of any of the systems or devices described in this disclosure.

For example, the system 1100 may be part of the first device 104 of FIG. 1 and may be configured to perform one or more of the tasks described above with respect to the first device 104. As another example, the system 1100 may be part of the transcription system 130 of FIG. 1 and may be configured to perform one or more of the tasks described above with respect to the transcription system 130.

Generally, the processor 1110 may include any suitable special-purpose or general-purpose computer, computing entity, or processing device including various computer hardware or software modules and may be configured to execute instructions stored on any applicable computer-readable storage media. For example, the processor 1110 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 11, it is understood that the processor 1110 may include any number of processors distributed across any number of networks or physical locations that are configured to perform individually or collectively any number of operations described herein. In some embodiments, the processor 1110 may interpret and/or execute program instructions and/or process data stored in the memory 1112. In some embodiments, the processor 1110 may execute the program instructions stored in the memory 1112.

For example, in some embodiments, the processor 1110 may execute program instructions stored in the memory 1112 that are related to transcription presentation such that the system 1100 may perform or direct the performance of the operations associated therewith as directed by the instructions. In these and other embodiments, the instructions may be used to perform one or more operations of the method 400, 500, 600, or the method 1000 of FIGS. 4, 5, 6, and 10.

The memory 1112 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1110.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 1110 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

The communication unit 1116 may include any component, device, system, or combination thereof that is configured to transmit or receive information over a network. In some embodiments, the communication unit 1116 may communicate with other devices at other locations, the same location, or even other components within the same system. For example, the communication unit 1116 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 1116 may permit data to be exchanged with a network and/or any other devices or systems described in the present disclosure. For example, when the system 1100 is included in the first device 104 of FIG. 1, the communication unit 1116 may allow the first device 104 to communicate with the transcription system 130.

The display 1118 may be configured as one or more displays, like an LCD, LED, Braille terminal, or other type of display. The display 1118 may be configured to present video, text captions, user interfaces, and other data as directed by the processor 1110. For example, when the system 1100 is included in the first device 104 of FIG. 1, the display 1118 may be configured to present a transcription.

The user interface unit 1120 may include any device to allow a user to interface with the system 1100. For example, the user interface unit 1120 may include a mouse, a track pad, a keyboard, buttons, camera, and/or a touchscreen, among other devices. The user interface unit 1120 may receive input from a user and provide the input to the processor 1110. In some embodiments, the user interface unit 1120 and the display 1118 may be combined.

The peripheral devices 1122 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 1100 or otherwise generated by the system 1100. The system 1100 may include a speech recognizer configured to respond to verbal commands captured by the microphone.

Modifications, additions, or omissions may be made to the system 1100 without departing from the scope of the present disclosure. For example, in some embodiments, the system 1100 may include any number of other components that may not be explicitly illustrated or described. Further, depending on certain implementations, the system 1100 may not include one or more of the components illustrated and described.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 may include a method including obtaining data regarding a condition of a device and selecting, for the device, an audio conveyance function from a plurality of audio conveyance functions based on the data, each of the plurality of audio conveyance functions configured to direct audio data in a unique manner to a transcription system. The method may also include implementing, by the device, the selected audio conveyance function such that audio data of a communication session involving the device is directed to the transcription system. In some embodiments, the transcription system may be configured to generate transcript data that includes a transcription of the audio data of the communication session. The method may also include obtaining, at the device, the transcript data from the transcription system for presentation by the device during the communication session.

Example 2 may include the implementations of example 1 where the condition of the device includes one or more of: an ambient noise level surrounding the device, access to the audio data of the communication session by a third-party application, secondary devices directly networked with the device, and a signal quality of a data signal obtained by the device.

Example 3 may include the implementations of example 1 and/or 2 where one of the plurality of audio conveyance functions includes establishing the communication session via a remote server associated with the transcription system, the remote server configured to direct the audio data to the transcription system.

Example 4 may include the implementations of examples 1, 2, and/or 3 where one of the plurality of audio conveyance functions includes: directing, by the device, the audio data of the communication session to another device configured to audible broadcast the audio data, receiving the audio data from the other device, and directing the audio data received from the other device to the transcription system.

Example 5 may include the implementations of examples 1, 2, 3, and/or 4 where one of the plurality of audio conveyance functions includes in response to the communication session, obtaining, at the device, a request for a second communication session with the transcription system and merging the communication session and the second communication session such that the audio data of the communication session is received at the transcription system.

Example 6 may include the implementations of examples 1, 2, 3, 4, and/or 5 where one of the plurality of audio conveyance functions includes directing, by the device, a service provider of the device to direct communication requests to a communication address unassociated with the service provider such that the communication session occurs using the communication address and directing, by the device, the audio data of the communication session to the transcription system.

Example 7 may include the implementations of examples 1, 2, 3, 4, 5, and/or 6 where one of the plurality of audio conveyance functions includes generating, by a microphone of the device, the audio data of the communication session using an audible audio signal that is broadcast by a speaker of the device and directing the audio data to the transcription system.

Example 8 may include the implementations of example 7 and may further include generating, by the device, second audio data that is not based on the audible audio broadcast by the device.

Example 9 may include the implementations of example 7 and/or 8 where the transcript data includes the transcription for the audio data and does not include a transcription of the second audio data.

Example 10 may include the implementations of example 9 where the transcript data includes first transcript data for the audio data and second transcript data for the second audio data.

Example 11 may include the implementations of any of examples 1-10 where the communication session is between the device and a remote device, and the audio data originates at the remote device.

Example 12 may include a method that may include obtaining a single audio channel that includes first audio data corresponding to voice signals from a first speaker and second audio data corresponding to voice signals from a second speaker and distinguishing between the first audio data and the second audio data in the single audio channel using information, the information being independent of the first audio data and the second audio data. The method may also include obtaining transcript data, the transcript data including a transcription of the first audio data and the transcript data providing an indication that the transcription is only of the first audio data, the transcript data configured for presentation to the second speaker.

Example 13 may include the implementations of example 12 where the information includes a format used by a CODEC for the first audio data and/or second audio data, camera signals, previously determined voiceprints of the second speaker and/or first speaker, signals indicating which speaker is speaking, voice activity detector info, and/or an indication the second speaker is hard of hearing.

As indicated above, the embodiments described herein may include the use of a special purpose or general-purpose computer (e.g., the processor 1110 of FIG. 11) including various computer hardware or software modules, as discussed in greater detail below. Further, as indicated above, embodiments described herein may be implemented using computer-readable media (e.g., the memory 1112 of FIG. 11) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

I claim:

1. A device, comprising:
   a speaker configured to broadcast an audible audio signal based on first audio data;
   a microphone configured to generate second audio data based on the audible audio signal broadcast by the speaker;
   a display configured to present transcript data; and
   a processing system configured to:
      obtain the first audio data during a communication session controlled by a native application running on the processing system, the native application not allowing non-native applications access to the first audio data;
      direct, via the native application, the first audio data to the speaker;
      direct, via a non-native application, the microphone to generate the second audio data;
      obtain, via the non-native application, the second audio data from the microphone;
      obtain, via the non-native application, the transcript data, the transcript data generated using the second audio data and including a transcription of the second audio data; and
      direct, via the non-native application, the transcript data to the display.

2. The device of claim 1, further comprising:
   a communication unit configured to:
      direct the second audio data generated by the microphone to a transcription system;
      receive the transcript data from the transcription system; and
      direct the transcript data to the processing system, such that the processing system obtains the transcript data from the communication unit.

3. The device of claim 2, wherein the communication unit is further configured to receive first audio data, the first audio data resulting from the communication session that is between the device and a remote device, wherein the first audio data originates at the remote device.

4. The device of claim 1, further comprising:
   a communication unit configured to:
      before the speaker broadcasts the first audio data, receive the first audio data, the first audio data resulting from the communication session that is between the device and a remote device, wherein the first audio data originates at the remote device.

5. The device of claim 1, wherein the processing system is configured to obtain the transcript data by generating the transcript data using a speech recognition algorithm.

6. The device of claim 1, wherein the display is configured to present the transcript data in substantially real-time with the generation of the second audio data by the microphone.

7. The device of claim 1, wherein the microphone is further configured to generate third audio data that is not based on audible audio broadcast by the speaker.

8. The device of claim 7, wherein the second audio data and the third audio data are included in a single audio channel and the processing system is further configured to divide the second audio data from the single audio channel, wherein the transcript data includes the transcription for the second audio data and does not include a transcription of the third audio data.

9. The device of claim 7, wherein the transcript data includes first transcript data for the second audio data and second transcript data for the third audio data.

10. The device of claim 9, wherein the transcript data includes data to distinguish between the first transcript data and the second transcript data.

11. A method of transcript presentation, the method comprising:
- obtaining first audio data during a communication session between a device and a remote device, the communication session controlled by a native application running on the device, the native application not allowing non-native applications access to the first audio data;
- directing, via the native application, the first audio data to a speaker to broadcast the first audio data as an audible audio signal;
- directing, via a non-native application running on the device, a microphone to generate second audio data based on the audible audio signal broadcast by the speaker;
- obtaining, via the non-native application, the second audio data from the microphone;
- obtaining, at the device via the non-native application, transcript data, the transcript data generated using the second audio data and including a transcription of the second audio data; and
- presenting, by the device, the transcript data.

12. The method of claim 11, further comprising directing the second audio data to a transcription system, wherein the transcript data is obtained by the device from the transcription system.

13. The method of claim 11, wherein obtaining the transcript data includes generating the transcript data using a speech recognizer and the second audio data.

14. The method of claim 11, wherein the first audio data originates at the remote device.

15. The method of claim 11, wherein the transcript data is presented in substantially real-time with the broadcasting of the audible audio signal by the device.

16. The method of claim 11, further comprising generating, by the device, third audio data that is not based on the audible audio signal broadcast by the device.

17. The method of claim 16, wherein the transcript data includes the transcription for the first audio data and does not include a transcription of the third audio data.

18. The method of claim 16, wherein the transcript data includes first transcript data for the first audio data and second transcript data for the third audio data.

19. At least one non-transitory computer-readable media configured to store one or more instructions that, in response to being executed by the device, cause or direct the device to perform the method of claim 11.

* * * * *